Nov. 13, 1934.　　　G. HAYMOND　　　1,980,405
GRAIN SEPARATOR
Filed April 2, 1930
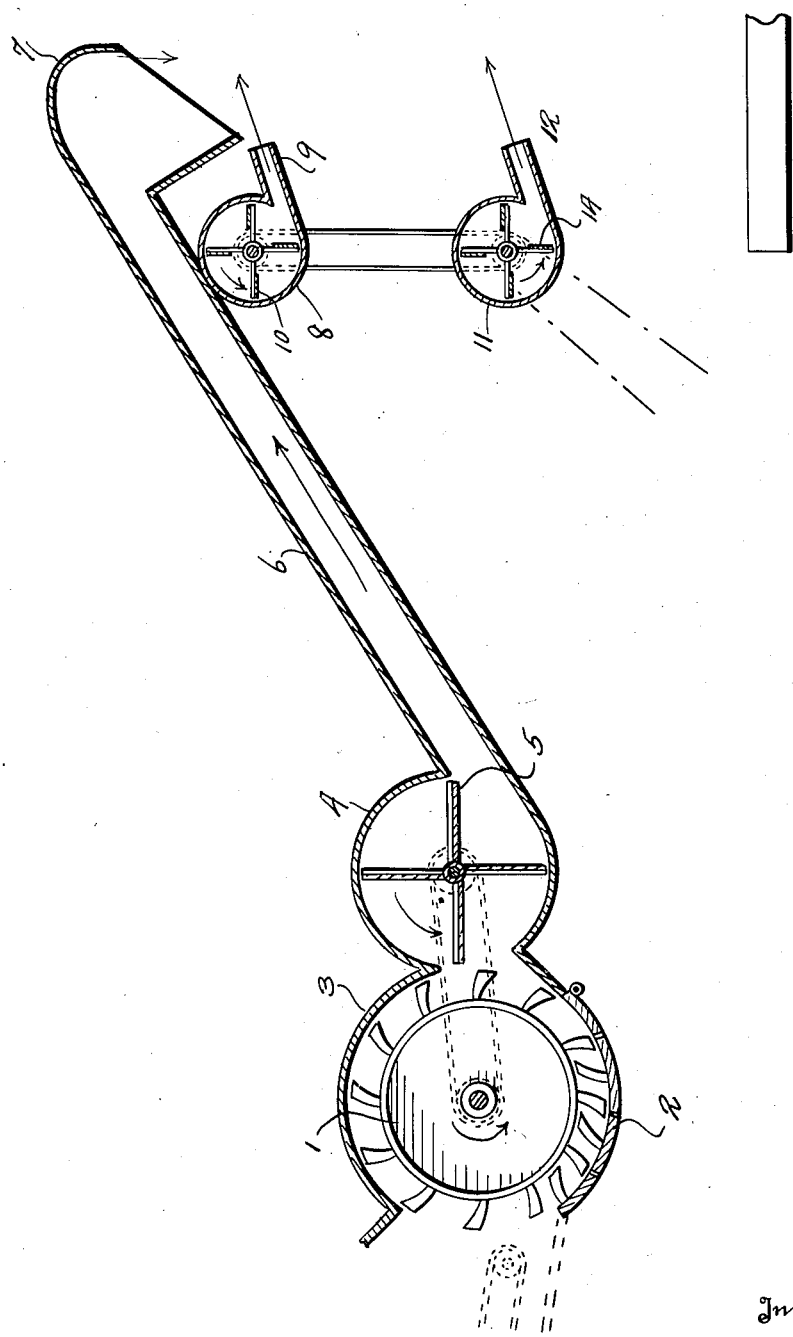
Inventor
G. Haymond
By Watson E. Coleman
Attorney Patented Nov. 13, 1934

1,980,405

UNITED STATES PATENT OFFICE 1,980,405

GRAIN SEPARATOR

Gilbert Haymond, Ellsworth, Kans.

Application April 2, 1930, Serial No. 441,086

2 Claims. (Cl. 130—27)

This invention relates to a grain separator, and it is an object of the invention to provide a device of this kind which is pneumatic in character and which operates effectually to separate the straw and chaff from the grain and which also operates to knock off the white caps and split heads and separate the same from the grain, thus avoiding the necessity of employing a return which is used in connection with separating machines now generally in use.

It is also an object of the invention to provide a device of this kind wherein the grain and associated material, after being acted upon by the threshing cylinder or the like, is lifted upwardly by air to a predetermined point of discharge and whereby the material so discharged is subjected to a blast of air flowing in a direction angular to the general direction of flow of discharge, the resultant pneumatic action effecting a thorough separation of the grain from the straw, chaff or other foreign matter.

The invention consists in the details of construction and in the combination and arrangement of the several parts of my improved grain separator whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein is illustrated a diagrammatic view partly in section and partly in elevation of a grain separator constructed in accordance with an embodiment of my invention.

As disclosed in the accompanying drawing, 1 denotes a threshing cylinder of a conventional type mounted and operating in the regular way and with which is associated the usual concave 2. Disposed over the upper rear portion of the cylinder 1 and in relatively close proximity thereto is a hood 3 and in communication with the interior of this hood at a point relatively close to the rear of the concave 2 is a casing 4 in which operates a high speed heavy duty fan 5.

This fan 5 creates sufficient suction to draw within its casing 4 the grain, straw and other foreign matter as it passes beyond the cylinder 1, and the fan 5 also creates a sufficient blast to carry said material up through the carry-off chute 6 to a desired point of discharge. This carry-off chute 6 leads from the rear portion of the fan casing 4 and is of regular rectangular cross section and is disposed upwardly and rearwardly on a predetermined incline.

The rear upper portion of the chute 6 terminates in a depending discharge nozzle 7, the delivery opening of which being relatively large so that the air will have full opportunity to expand a sufficient extent to assure the proper downward flow of the grain to effect the requisite separation thereof. This blast of air passing up and out through the carry-off chute 6 also serves to take away a certain amount of the straw or chaff but not a sufficient amount to assure complete separation. It is, therefore, essential that the grain as it flows from the upper discharge end of the chute 6 be subjected to further separating action.

The upper rear portion of the chute 6 carries a casing 8 having a rearwardly disposed discharge nozzle 9, said nozzle being arranged on an upward and rearward incline so that the air blast discharged therefrom will have the most effective action upon the grain. Working within this casing 8 is a fan 10 driven at a speed which best complies with the requirements of practice.

In actual practice it has been found that the separating of the grain as it leaves the discharge end of the chute 6 to only a single blast of air is not sufficient to effect the desired separation and, therefore, I position below the casing 8 a second casing 11 having a discharge spout 12 disposed in the same general direction as the discharge nozzle 9 of the casing 8.

Working in this casing 11 is a fan 14 also driven at a predetermined speed.

It is to be stated that the speed of the fans 10 and 14 is to be adjusted or regulated in accordance with the particular machine and in a manner whereby the blasts of air created thereby will be sufficient to blow off the straw, chaff or other foreign matter dropping down with the grain but insufficient to throw the grain off from the conventional shoe positioned below the discharge end of the chute 6 to receive such grain.

It is also to be noted that the lower forward end of the discharge opening of the chute 6 is positioned below the upper rear portion thereof. This is of advantage as it thus allows the continued rearward travel of the air after leaving the chute 6.

It is to be understood that the various parts of my invention as hereinbefore described are suitably mounted and supported upon the structure of a combine or otherwise as may be preferred.

As is clearly illustrated in the accompanying drawing, the upper or high portion of the nozzle 7 extends entirely across the outer end of the chute 6 proper whereby said upper or high portion serves as a deflector to cause the grain carried out through the chute 6 to drop downwardly.

The heavy duty fan serves to knock out all grain not threshed by the cylinder 1 and also removes the white caps from the grain thus dispensing with the need of a return. The heavy duty fan 5 as well as the fans 10 and 14 can be made to work satisfactorily when said fans have two, three or four blades and the chute 6 can vary as to size, shape and length.

It has also been fully demonstrated in practice that the machine will work successfully and satisfactorily with but one of the fans 10 or 14. It is also to be stated that the position of the different fans can be changed other than shown in the drawing without interfering with the satisfactory operation of the apparatus, and that the fans may be caused to rotate clockwise or anti-clockwise.

From the foregoing description it is thought to be obvious that a grain separator constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination, a threshing cylinder mounted on a substantially horizontal axis, a fan, comprising a shaft mounted parallel to the axis of threshing cylinder and having blades extending radially from the shaft, the periphery of the blades being adjacent the periphery of the cylinder at one point, a casing closely encircling both the thresher and fan, and having a restricted opening between the thresher and fan, and a chute extending tangentially from the lower portion of the fan casing in an upwardly inclined direction.

2. The combination as specified in claim 1, in which the chute is of regular cross section, a deflector mounted on the upper end of the chute to direct the threshed material downwardly and a fan extending the full width of the chute for directing a blast of air through the falling material.

GILBERT HAYMOND.